United States Patent
Stephenson

(10) Patent No.: US 6,667,785 B2
(45) Date of Patent: Dec. 23, 2003

(54) PROVIDING A COLOR IMAGE IN A LIGHT MODULATING LAYER HAVING LIQUID CRYSTAL DOMAINS

(75) Inventor: Stanley W. Stephenson, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 345 days.

(21) Appl. No.: 09/764,015

(22) Filed: Jan. 17, 2001

(65) Prior Publication Data

US 2002/0093605 A1 Jul. 18, 2002

(51) Int. Cl.⁷ .............................................. G02F 1/1333
(52) U.S. Cl. .......................................... 349/86; 349/111
(58) Field of Search ................................. 319/110, 111, 319/43, 88

(56) References Cited

U.S. PATENT DOCUMENTS

| | | | |
|---|---|---|---|
| 3,816,786 A | | 6/1974 | Churchill et al. |
| 4,435,047 A | | 3/1984 | Fergason |
| 4,878,741 A | * | 11/1989 | Fergason ..................... 349/79 |
| 5,223,959 A | | 6/1993 | Wu et al. |
| 5,282,070 A | * | 1/1994 | Nishida et al. .............. 349/111 |
| 5,289,300 A | * | 2/1994 | Yamazaki et al. ............. 349/42 |
| 5,289,301 A | | 2/1994 | Brewer |
| 5,414,547 A | * | 5/1995 | Matsuo et al. ................ 349/44 |
| 5,437,811 A | | 8/1995 | Doane et al. |
| 5,452,113 A | * | 9/1995 | Ikeno .......................... 349/77 |
| 5,691,790 A | * | 11/1997 | Havens et al. ............... 349/113 |

FOREIGN PATENT DOCUMENTS

WO    WO 97/04398    2/1997

\* cited by examiner

*Primary Examiner*—Kenneth Parker
(74) *Attorney, Agent, or Firm*—Raymond L. Owens

(57) ABSTRACT

A display sheet having polymer dispersed liquid crystals including a substrate; a state changing layer disposed over the substrate and defining first and second surfaces, such state changing layer having the polymer dispersed liquid crystals having first and second optical states, which can change state; and a first transparent conductor disposed on the first surface of the state changing layer. The display sheet also includes a second conductor on the second surface of the state changing layer and has a composite structure of at least two layers of different materials wherein the composite structure absorbs light and is electrically conductive so that when a field is applied between the first and second conductors, the liquid crystals change state.

21 Claims, 6 Drawing Sheets

PROVIDING A COLOR IMAGE IN A LIGHT MODULATING LAYER HAVING LIQUID CRYSTAL DOMAINS

CROSS REFERENCE TO RELATED APPLICATIONS

Reference is made to commonly assigned U.S. patent application Ser. No. 09/146,656 filed Sep. 3, 1998 entitled "Reflective Sheet Display With Laser Patternable Coating" by Stanley W. Stephenson et al., and U.S. patent application Ser. No. 09/336,931 filed Jun. 21, 1999 entitled "A Sheet Having a Layer With Different Light Modulating Materials" by Stanley W. Stephenson, the disclosures of which are incorporated herein by reference.

FIELD OF THE INVENTION

The present invention relates to a display sheet having a layer which can change states to provide a viewable image.

BACKGROUND OF THE INVENTION

Currently, information is displayed using assembled sheets of paper carrying permanent inks or displayed on electronically modulated surfaces such as cathode ray displays or liquid crystal displays. Other sheet materials can carry magnetically writable areas to carry ticketing or financial information, however magnetically written data is not visible.

A structure is disclosed in PCT/WO 97/04398, entitled "Electronic Book With Multiple Display Pages" which is a thorough recitation of the art of thin, electronically written display technologies. Disclosed is the assembling of multiple display sheets that are bound into a "book", each sheet is arranged to be individually addressed. The patent recites prior art in forming thin, electronically written pages, including flexible sheets, image modulating material formed from a bi-stable liquid crystal system, and thin metallic conductor lines on each page.

Fabrication of flexible, electronically written display sheets are disclosed in U.S. Pat. No. 4,435,047. A first sheet has transparent ITO conductive areas and a second sheet has electrically conductive inks printed on display areas. The sheets can be glass, but in practice have been formed of Mylar polyester. A dispersion of liquid crystal material in a binder is coated on the first sheet, and the second sheet is bonded to the liquid crystal material. Electrical potential applied to opposing conductive areas operate on the liquid crystal material to expose display areas. The display uses nematic liquid crystal material which ceases to present an image when de-energized.

U.S. Pat. No. 5,223,959 discloses a plurality of polymer dispersed liquid crystal material, each having a different dye material of red, green, or blue dye material. Differing electrical signals to common electrodes operate on each of the materials to control the state of each type of dyed liquid crystal material. The patent requires the use of conventional nematic liquid crystals with a dye to absorb light. The droplets are chemically treated to be stable in either a clear or a light absorbing state. The invention also requires materials having different response times to electrical signals. The device must be continually driven so that the human eye perceives complementary colors. This arrangement has the disadvantage of requiring continuous, high speed electrical drive because the materials do not maintain their state. The material must be driven to achieve a neutral color density.

U.S. Pat. No. 5,437,811 discloses a light-modulating cell having a polymer dispersed chiral nematic liquid crystal. The chiral nematic liquid crystal has the property of being driven between a planar state reflecting a specific visible wavelength of light and a light scattering focal-conic state. Said structure has the capacity of maintaining one of the given states in the absence of an electric field.

U.S. Pat. No. 3,816,786 discloses droplets of cholesteric liquid crystal in a polymer matrix responsive to an electric field. The electrodes in the patent can be transparent or non-transparent and formed of various metals or graphite. It is disclosed that one electrode must be light absorbing and it is suggested that the light absorbing electrode be prepared from paints containing conductive material such as carbon.

U.S. Pat. No. 5,289,301 discusses forming a conductive layer over a liquid crystal coating to form a second conductor. The description of the preferred embodiment discloses indium tin oxide (ITO) over a liquid crystal dispersion to create a transparent electrode.

Current state of the art discloses the need for a second conductor over a polymer dispersed liquid crystal material. In particular, cholesteric materials require one of the two conductors to be light absorbing and conductive. Materials have been proposed for the application including carbon or metal oxides to create a black and conductive surface for polymer dispersed cholesteric liquid crystal materials.

SUMMARY OF THE INVENTION

It is an object of this invention to provide a display sheet having a light absorbing and electrically conductive electrode for cholesteric liquid crystals.

It is another object of the invention to provide a the electrically conductive electrode which is light absorbing, highly conductive and durable.

It is a further object of the invention to provide an effective, rapid method of forming said light absorbing, electrically conductive electrode for use in a display sheet.

These objects are achieved in a display sheet having polymer dispersed liquid crystals, comprising:

a) a substrate;

b) a state changing layer disposed over the substrate and defining first and second surfaces, such state changing layer having the polymer dispersed liquid crystals having first and second optical states, which can change state;

c) a first transparent conductor disposed on the first surface of the state changing layer; and d) a second conductor on the second surface of the state changing layer and having a composite structure of at least two layers of different materials wherein the composite structure absorbs light and is electrically conductive so that when a field is applied between the first and second conductors, the liquid crystals change state.

The present invention provides for first and second conductors that maximize light absorption and electrical conductivity of the second conductor. Materials are disclosed that can be deposited in a single multi-station vacuum evaporator to provide a low-cost, durable and conductive surface.

DETAILED DESCRIPTION OF THE PREFERRED EMBODIMENT

Figure 1A:
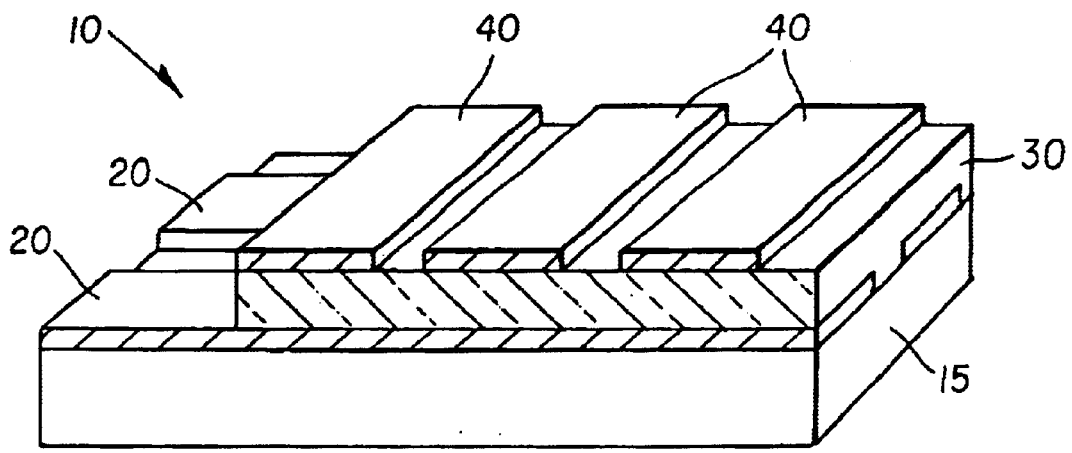
FIG. 1A is a sectional view of a prior art sheet having a polymer dispersed cholesteric liquid crystal.

FIG. 1A is a sectional view of a prior art display sheet 10 having a polymer dispersed cholesteric liquid crystal made in accordance prior art. It will be understood that other forms of media such as a more permanent display can also be used in accordance with the present invention. Sheet 10 includes a flexible substrate 15, which is a thin transparent polymeric material, such as Kodak Estar film base formed of polyester plastic that has a thickness of between 20 and 200 microns. In an exemplary embodiment, substrate 15 can be a 125 micron thick sheet of polyester film base. Other polymers, such as transparent polycarbonate, can also be used.

First conductor 20 is formed over substrate 15. First conductor 20 can be tin oxide or indium tin oxide (ITO), with ITO being the preferred material. Typically, the ITO comprising first conductor 20 is sputtered as a layer over substrate 15 to form a layer having a sheet resistance of less than 250 ohms per square. First conductor 20 can be patterned by conventional lithographic or laser etching means.

A state changing layer is formed by coating a polymer dispersed cholesteric liquid crystal layer 30 onto first patterned conductors 20. The polymer dispersed cholesteric liquid crystal layer 30 acts as a light modulator. The polymer dispersed cholesteric liquid crystal layer defines first and second surfaces. Cholesteric materials can be created that have peak reflectance from the infrared through the visible spectrum by varying the concentration of chiral dopant in a nematic liquid crystal. Application of electrical fields of various intensities and duration can drive a chiral nematic material (cholesteric) into a reflective state, a transmissive state, or an intermediate state. These materials have the advantage of maintaining a given state indefinitely after the field is removed. Such materials can be cholesteric liquid crystal materials can be Merck BL112, BL118 or BL126, available from EM Industries of Hawthorne, N.Y.

Figure 2:
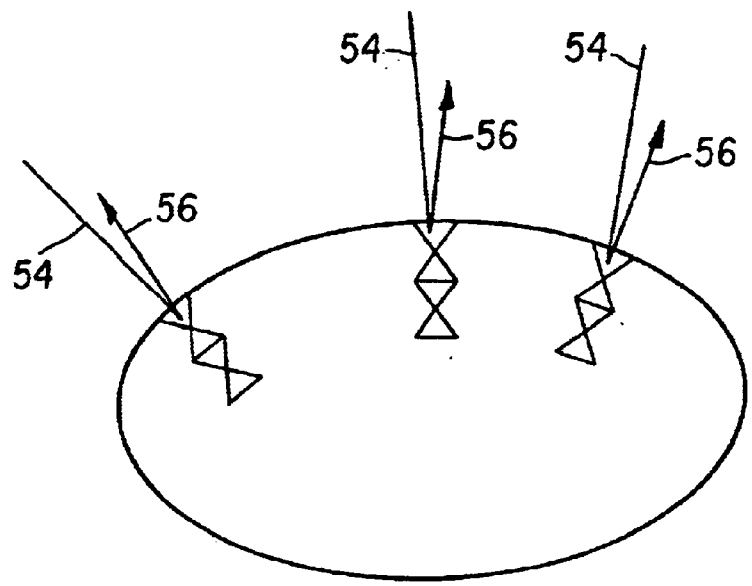
FIG. 2 is a sectional view of a domain of cholesteric liquid crystal in a polymer matrix.

FIG. 2 shows a portion of a polymer dispersed cholesteric liquid crystal layer 30, which can be cholesteric material dispersed in deionized photographic gelatin. The liquid crystal material is dispersed at 8% concentration in a 5% deionized gelatin aqueous solution. It has been found that 10 micron diameter domains of the cholesteric liquid crystal in aqueous suspension optimize the electrooptical properties of the cholesteric materials. At that domain size, portions of incident light 54 at a given wavelength will become reflected light 56. The encapsulation process provides a pressure resistant material that improves the viewing angle of the cholesteric liquid crystal. The first surface of polymer dispersed cholesteric liquid crystal layer 30 is coated over first conductors 20 to provide a 10 micron thick polymer dispersed cholesteric coating. Other organic binders such as polyvinyl alcohol (PVA) or polyethylene oxide (PEO) can be used as the polymeric agent. Such compounds are can be coated on equipment associated with photographic films.

Figure 3:
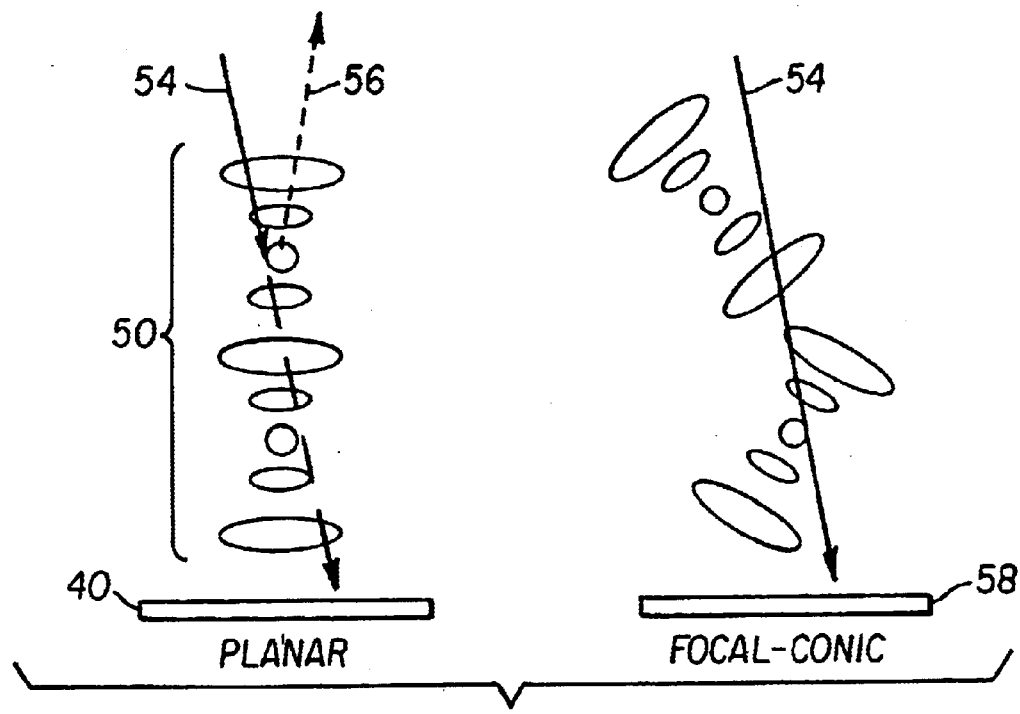
FIG. 3 is a view of the optical characteristics of cholesteric liquid crystal in each of two stable states.

FIG. 3 shows two stable states of cholesteric liquid crystals. On the left, a high voltage field has been applied and quickly switched to zero potential, which converts cholesteric liquid crystal to planar liquid crystal 50. Portions of incident light 54 striking planar liquid crystal 50 becomes reflected light 56 to create a bright image. On the right, application of a lower voltage field converts cholesteric liquid crystal to a transparent focal conic liquid crystal 52. Incident light 54 striking focal conic liquid crystal 52 is transmitted. A light absorber 58 will absorb incident light 54 to create a dark image in areas having focal conic liquid crystal 52. As a result, a viewer perceives an image having bright and dark areas depending on if the cholesteric material is planar liquid crystal 50 or focal conic liquid crystal 52, respectively. A sheet 10 having polymer dispersed cholesteric liquid crystal layer 30 needs to have one transparent conductor and one light absorbing conductor. In the first exemplary embodiment, first conductor 20 is transparent ITO.

In FIG. 1A, second conductor 40 needs be light absorbing to provide light absorbing surface 58 disposed on the second surface of polymer dispersed cholesteric liquid crystal layer 30. Second conductor 40 should have sufficient conductivity to carry a field across the material in the polymer dispersed cholesteric liquid crystal layer 30. Second conductor 40 has been characterized by prior art by being a conductive material such as aluminum, tin, silver, platinum, carbon, tungsten, molybdenum, tin or indium or combinations thereof. It is also well known that oxides of many of these metals are light absorbing to provide light absorber 58. Prior art has also suggested that second conductor 40 can be a printed traces. First conductors 20 and second conductors can be patterned orthogonal traces to form an addressable matrix of pixels. In the case of printed conductors, the resolution of a matrix display is limited by the resolution of the printing process. Printing processes are limited to approximately 125 micron areas without material, limiting pixel pitch to about 1 millimeter.

Figure 1B:
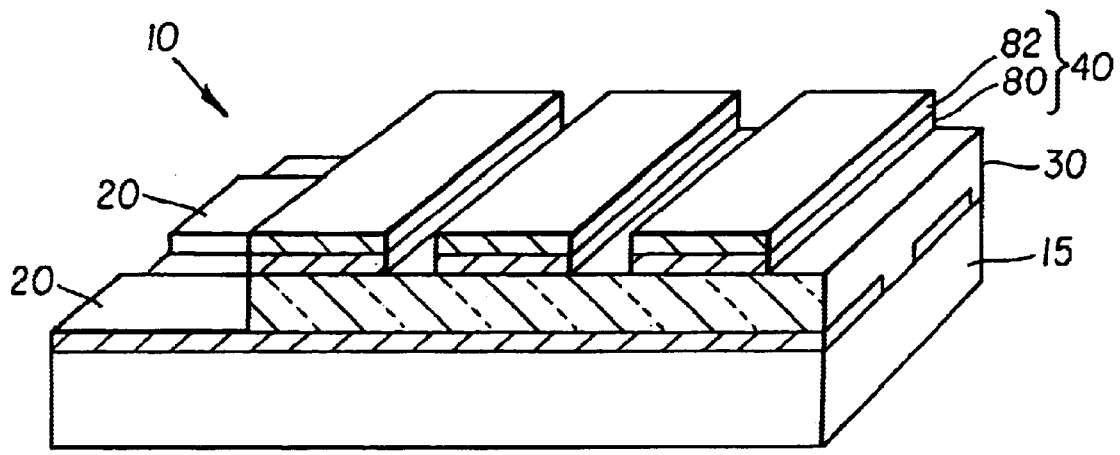
FIG. 1B is a sectional view of a sheet having a polymer dispersed cholesteric liquid crystal in accordance with the present invention.

FIG. 1B is a sectional view of a display sheet having a polymer dispersed cholesteric liquid crystal layer 30 in accordance with the present invention. A light absorbing second conductor 40 includes two layers that are vacuum deposited. The first layer is light absorbing layer 80 which is deposited directly over polymer dispersed liquid crystal layer 30. In the preferred embodiment light absorbing layer 80 is evaporated carbon. Evaporated carbon has the advantage of being chemically inert and light absorbing. However, carbon has multiple orders of magnitude poorer conduction than metals such as copper, aluminum, nickel, or chromium.

Evaporative carbon layers are also fragile. The present invention provides the second layer as a conductive layer 82 over a carbon, light absorbing layer 80. In a preferred embodiment conductive layer 80 is nickel, which provides a best combination of high electrical conductivity, abrasion resistance, corrosion resistance and low cost.

The voltage required to change the optical state the polymer dispersed cholesteric liquid crystal layer 30 is proportional to the distance between the opposing electrodes. Polymer dispersed cholesteric liquid crystal layer 30 must be at least 4 microns thick to have high reflectivity. The two vacuum deposited layers proposed for second conductor 40 will be less than 0.1 microns thick, an order of magnitude thinner than the thickness of polymer dispersed cholesteric liquid crystal layer 30. The thinness of second conductor 40 in this embodiment makes the electrical conductivity of light absorbing layer 80 unimportant. Consequently, light absorbing layer 80 could also be a nonconductive oxide of a metal, such as copper oxide. Typically, such oxides of metals are functionally nonconductive. The addition of second, conductive layer 82 over a completely nonconducting light absorbing layer 80 creates a composite material having high light absorption and high electrical conductivity and are thin enough that the thickness of nonconductive layer light absorbing layer 80 will not increase drive voltages.

Typically, the creation of a metal oxide on a polymeric surface requires good stochiometric control though use of a sputtering process or ion implantation during evaporative deposition. Such methods are complex or slow. It is advantageous to apply both light absorbing layer 80 and conductive layer 82 using simple, fast methods. The already disclosed preferred embodiment using carbon and nickel layers deposited as single atomic species for both light absorbing layer 80 and conductive layer 82 use simple, fast evaporation process. The layers 80 and 82 provides a second conductor that absorbs selected wavelengths of light and is electrically conductive so that when a field is applied between the first and second conductors, the liquid crystals change state.

Figure 4A:
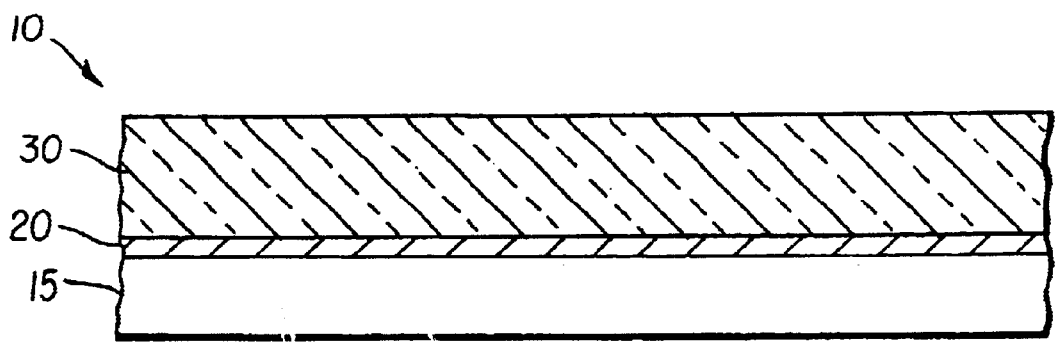
FIG. 4A is a sectional view of a sheet coated with a polymer dispersed cholesteric liquid crystal in accordance with the present invention.
Figure 4B:
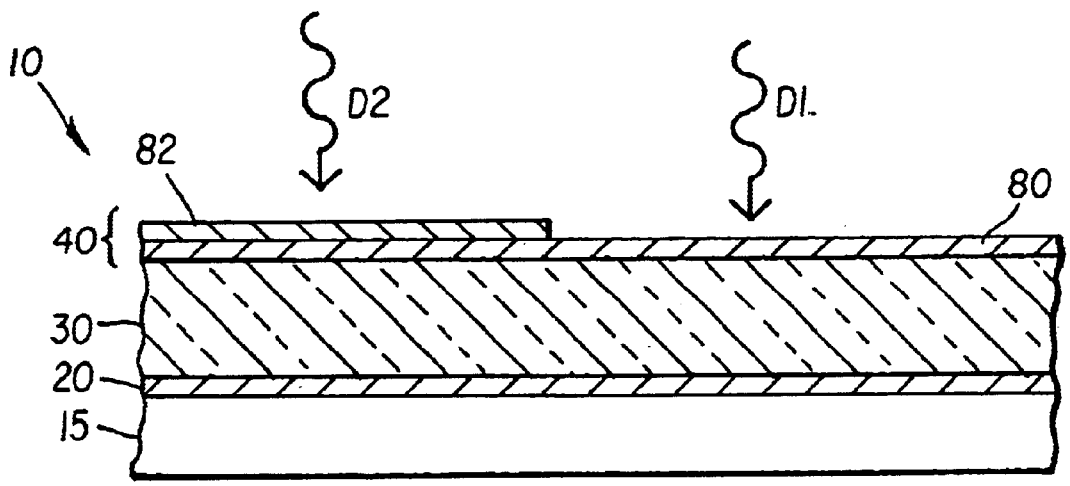
FIG. 4B is as sectional view of the sheet of FIG. 4A receiving two evaporative coatings.
Figure 4C:
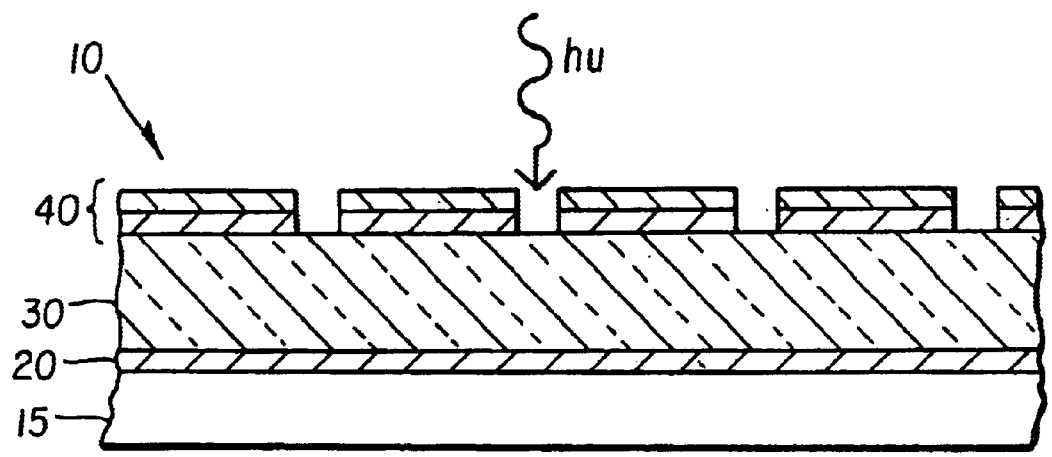
FIG. 4C is a sectional view of the sheet of FIG. 4B being laser etched.

FIG. 4A is a sectional view of an experimental sheet 10 which had a polymer dispersed 10 micron domains of a green reflective cholesteric material, BL118 coated over first conductor 20. The material had a peak reflectance of 550 nanometers. In FIG. 4B, a second conductor 40 was created over polymer dispersed cholesteric liquid crystal layer 30 using two evaporative depositions, D1 and D2. D1 was evaporated carbon applied directly over polymer dispersed cholesteric liquid crystal layer 30 to form light absorbing layer 80. D2 was evaporated nickel deposited over the carbon light absorbing layer 80. FIG. 4C is a sectional view of the sheet 10 being etched using a YAG laser having a wavelength of 1064 nanometers. The laser energy hu is applied to remove second conductor 40 without penetrating polymer dispersed cholesteric liquid crystal layer 30 and vaporizing first conductor 20. Such lasers can remove light absorbing layer 80 and conductive layer 82 at higher than 25 micron resolution, permitting displays having pixel pitch of less than 0.30 millimeter. Alternatively, a blade was used to break the coated layer into separate second conductors 40.

Figure 5:
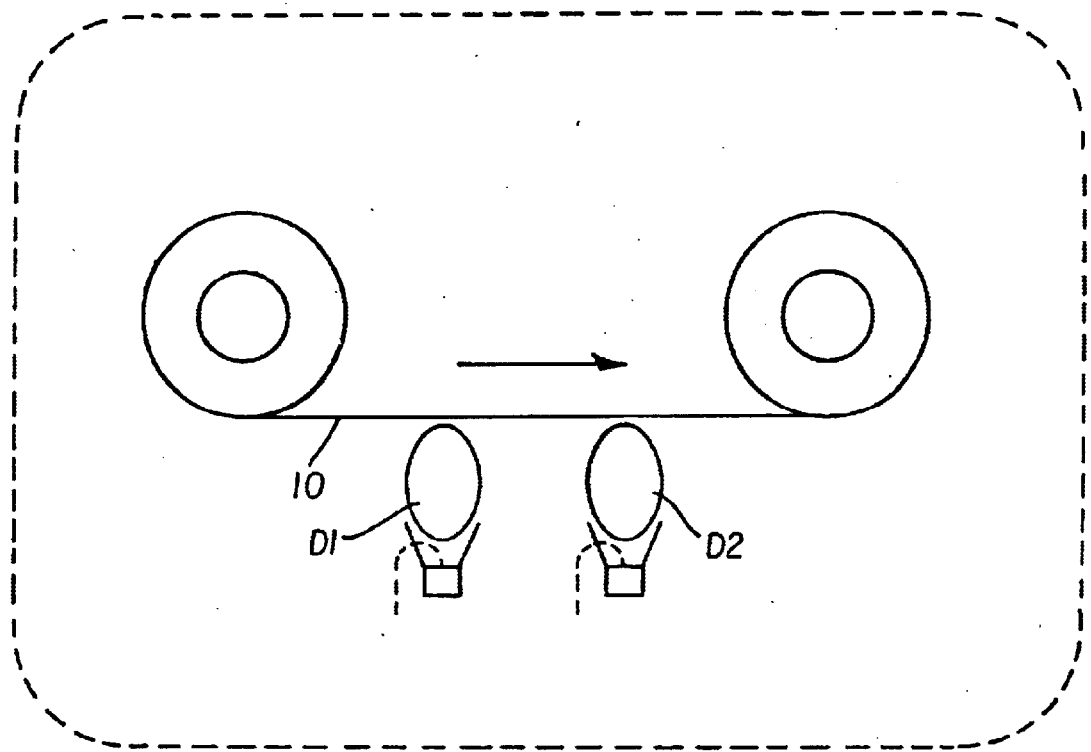
FIG. 5 is a sectional view of a machine simultaneously applying two evaporative coatings.

FIG. 5 is a diagram of the process used to apply both light absorbing layer 80 and conductive layer 82. In a vacuum chamber, two e-beam evaporators (D1 and D2) deposit light absorbing layer 80 and conductive layer 82 onto sheet 10, which in this case is part of a web. The roll of material passes sequentially past a first carbon evaporation station D1 and a second nickel evaporation station D2 to form a light absorbing, electrically conducting layer over polymer dispersed cholesteric liquid crystal layer 30. Subsequent etching converted the coating into second conductors 40.

Figure 6:
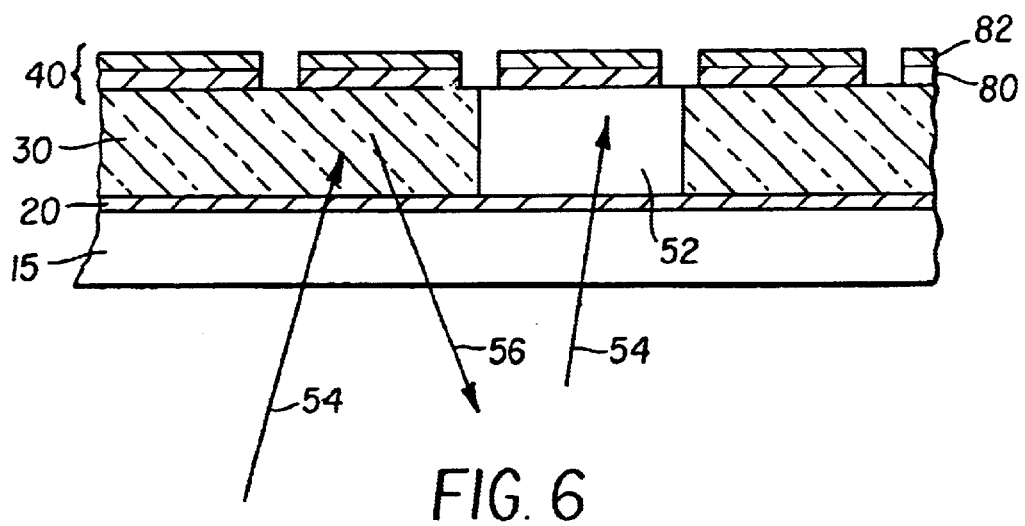
FIG. 6 is a sectional view of a sheet having polymer dispersed cholesteric liquid crystals used as a monochrome display.
Figure 7:
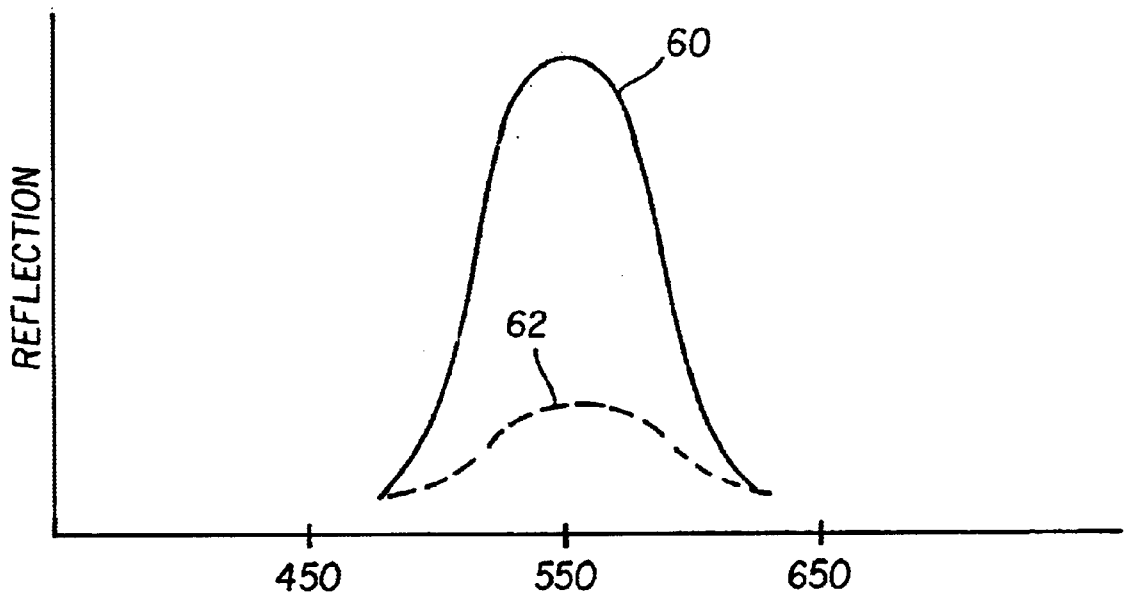
FIG. 7 is the spectral reflection of the sheet in FIG. 6.

FIG. 6 is a sectional view of an experimental sheet 10 having green reflective cholesteric liquid crystal. Second conductors 40 has been created by vacuum depositing a first light absorbing layer 80 and a second conductive layer 82. A high voltage pulse has been applied to convert all domains to the planar, reflective state. A low voltage pulse has been applied in one area using first conductors 20 and second conductors 40 to convert certain cholesteric domains to transparent focal conic liquid crystals 52 to create a dark, non-reflecting area. FIG. 7 is a diagram showing that initial green reflectance 60 has been reduced to written green reflectance 62 by the application of a low voltage pulse. Sheet 10 can be erased and re-written by the application of a high voltage pulse across first conductors 20 and second conductors 40.

Figure 8:
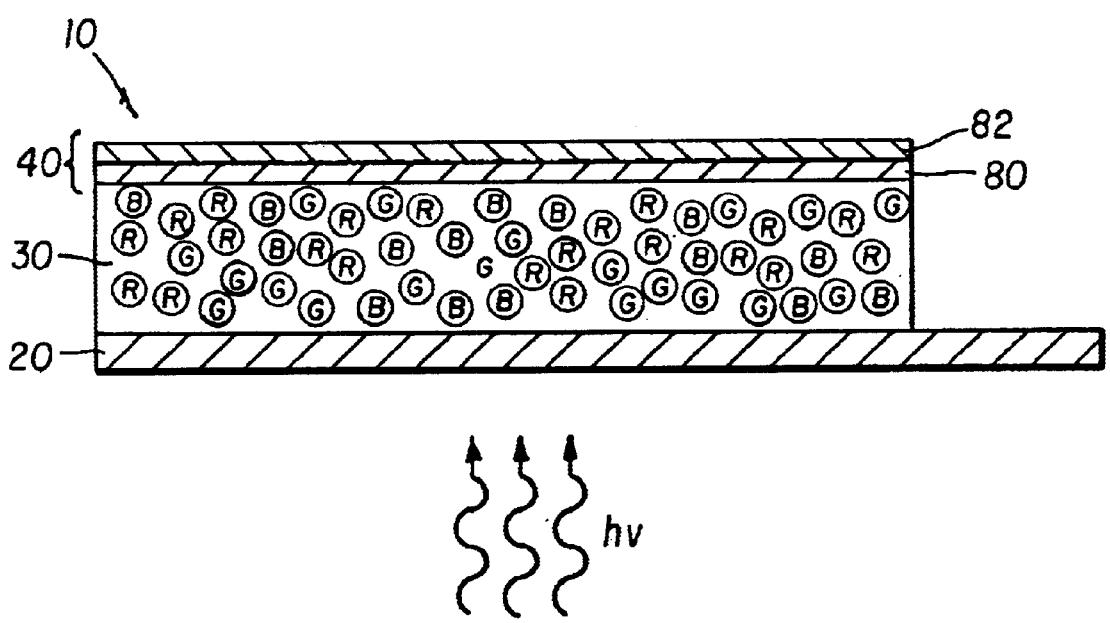
FIG. 8 is a sectional view of a sheet having certain ones of different polymer dispersed cholesteric liquid crystals being selectively light written.
Figure 9:
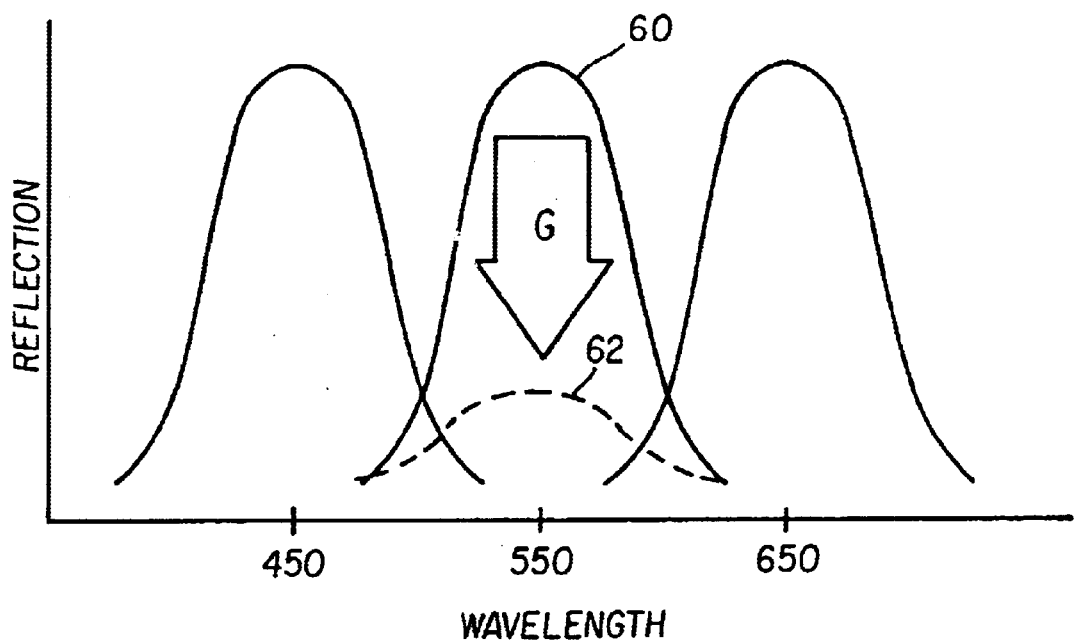
FIG. 9 is the spectral reflection of the sheet in FIG. 5.

FIG. 8 is a sectional view of an experimental sheet 10 having red, green and blue reflective cholesteric liquid crystal. Second conductor 40 has been created by vacuum depositing a first light absorbing layer 80 and a second conductive layer 82. A voltage has been applied to convert all domains to the planar, reflective state. A high intensity green writing light hu is applied to the sheet and selectively cleared only the green domains. FIG. 9 is a diagram showing that initial green reflectance 60 has been reduced to written green reflectance 82 by the application of actinic green light. The domains can be written by various light writing methods such as a directed laser beam or projected green filtered incandescent light. Sheet 10 can be erased and re-written by the application of voltage across first conductor 20 and second conductor 40. In this particular application, first conductor 20 and second conductor 40 do not need to be laser patterned.

Figure 10:
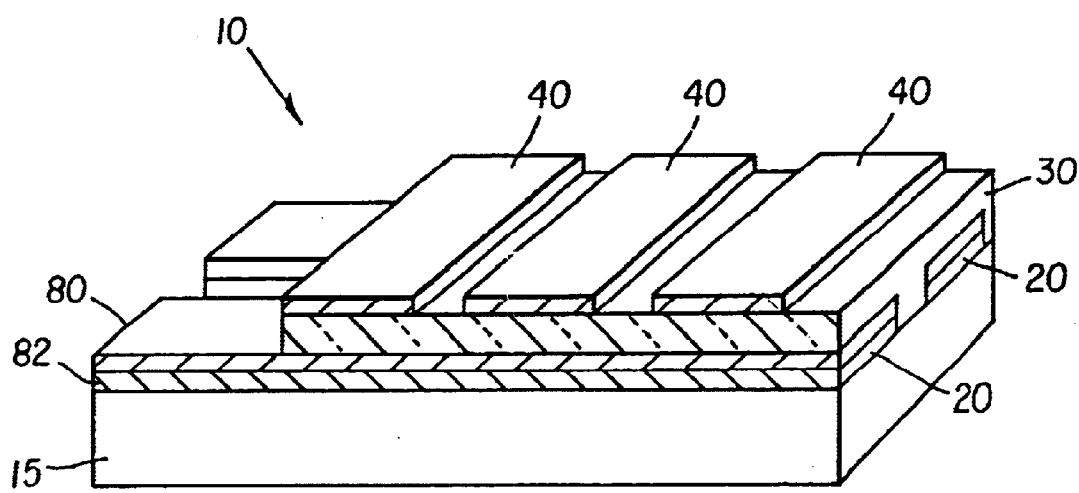
FIG. 10 is an alternative structure of a sheet made in accordance with the present invention.

FIG. 10 is an alternative structure in accordance with the current invention. In this embodiment, a light conductive, electrically layer is formed over substrate 15. In this embodiment, conductive layer 82 is deposited first onto substrate 15, followed by light absorbing layer 80. The two vacuum deposited layers can be patterned to form a light absorbing, electrically conductive first conductor 20. Polymer dispersed cholesteric liquid crystal layer 30 is then coated over light absorbing, electrically conductive first conductors 20. Second conductor 40 is created by vacuum depositing indium tin oxide (ITO) to create a transparent, field carrying surface. The resulting structure uses the same processes and materials as the first embodiment, but in reversed order over substrate 15.

The invention has been described in detail with particular reference to certain preferred embodiments thereof, but it will be understood that variations and modifications can be effected within the spirit and scope of the invention.

Parts List 10 display sheet
15 substrate
20 first conductors
30 polymer dispersed cholesteric liquid crystal layer
40 second conductors
50 planar liquid crystals
52 focal-conic liquid crystals
54 incident light
56 reflected light
58 light absorber
60 initial green reflection
62 written green reflection 80 light absorbing layer
82 conductive layer
D1 evaporative deposition
D2 evaporative deposition 2
hu light

What is claimed is:

1. A display sheet having polymer dispersed liquid crystals, comprising:
   a) a substrate;
   b) a state changing layer disposed over the substrate defining first and second surfaces, such state changing layer having the polymer dispersed liquid crystals having first and second optical states, a first state reflecting selected wavelengths of light and a second state transmitting said wavelengths of light;
   c) a first transparent conductor disposed on the first surface of the state changing layer;
   d) a second conductor on the second surface of the state changing layer and having a composite structure of at least two layers of different materials wherein the composite structure absorbs the selected wavelengths of light and is electrically conductive so that when a field is applied between the first and second conductors, the liquid crystals change state; and
   e) wherein the at least two layers include a layer having light absorbing, low conductive material disposed adjacent to the state changing layer and another layer having high conductivity material.

2. The display sheet of claim 1 wherein the light absorbing, low conductivity material includes carbon and the high conductivity material includes a high conductivity metal.

3. The display sheet of claim 2 wherein the high conductivity metal is nickel or chromium or alloys thereof.

4. The display sheet of claim 1 wherein the second conductor is disposed directly on the substrate.

5. The display sheet of claim 4 wherein the first layer includes indium tin oxide.

6. A display sheet having polymer dispersed liquid crystals, comprising:
   a) a substrate;
   b) a state changing layer disposed over the substrate having first and second surfaces, such state changing layer having the polymer dispersed cholesteric liquid crystals having first and second optical states;
   c) a first transparent conductor disposed on the first surface of the state changing layer;
   d) a second conductor on the second surface of the state changing layer and having a composite structure of at least two layers of different materials wherein the composite structure light and is electrically conductive so that when a field is applied between the first and second conductors, the liquid crystals change state; and
   e) wherein the at least two layers include a layer having light absorbing, low conductive material disposed adjacent to the state changing layer and another layer having high conductivity material.

7. The display sheet of claim 6 wherein the light absorbing, low conductivity material includes carbon and the high conductivity material includes a high conductivity metal.

8. The display sheet of claim 7 wherein the high conductivity metal is nickel or chromium or alloys thereof.

9. A method of making a display sheet having polymer dispersed liquid crystals comprising the steps of:
   a) providing a substrate;
   b) coating a state changing layer over the substrate having a first and second surface, such state changing layer having the polymer dispersed liquid crystals having first and second optical states, the first state absorbing selected wavelengths of light and the second state transmitting the selected wavelengths of light;
   c) providing a first transparent conductor disposed on the first surface of the state changing layer; and
   d) forming a second conductor on the second surface of the state changing layer and having a composite structure of at least two layers of different materials wherein the composite structure absorbs the selected wavelengths of light and is electrically conductive so that when a field is applied between the first and second conductors, the liquid crystals change state.

10. The method of claim 9 further including evaporatively depositing the two or more layers of the second conductor.

11. The method of claim 10 wherein the display sheet is in the form of a web that is sequentially moved through a plurality of evaporative deposition stations which deposit the two or more layers of the second conductor.

12. The method of claim 9 wherein indium tin oxide is sputtered to form the first transparent conductor.

13. The method of claim 11 further including patterning the first and second conductors to produce an addressable matrix.

14. A method of making a display sheet having polymer dispersed liquid crystals, comprising the steps of:
   a) providing a substrate;
   b) coating a state changing layer disposed over the substrate having first and second surfaces, such state changing layer having the polymer dispersed liquid crystals having first and second optical states;
   c) sputtering a first transparent conductor disposed on the first surface of the state changing layer; and
   d) coating a first layer having a light absorbing, low conductive material disposed adjacent to the state changing layer and coating a second layer having high conductivity material to form a composite structure that light and is electrically conductive so that when a field is applied between the first and second conductors, the liquid crystals change state.

15. The method of claim 14 wherein the light absorbing, low conductivity material includes carbon and the high conductivity material includes a high conductivity metal.

16. The display sheet of claim 15 wherein the high conductivity metal is nickel or chromium or alloys thereof.

17. The method of claim 14 wherein the display sheet is in the form of a web that is sequentially moved through a plurality of evaporative deposition stations which deposit the two or more layers of the second conductor.

18. A method of making a display sheet having polymer dispersed liquid crystals, comprising the steps of:
   a) providing a substrate;
   b) coating a state changing layer over the substrate having a first and second surface, such state changing layer having the polymer dispersed liquid crystals having first and second optical states, a first state reflecting selected wavelengths of light and a second state transmitting said wavelengths of light;

c) sputtering a first transparent conductor on the first surface of the state changing layer; and d) forming a second conductor on the second surface of the state changing layer by sequentially coating at least two layers of different materials including a layer having a light absorbing, low conductive material disposed adjacent to the state changing layer and another layer having high conductivity material to form a composite structure that absorbs the selected wavelengths of light and is electrically conductive so that when a field is applied between the first and second conductors, the liquid crystals change state.

19. The method of claim 18 wherein the light absorbing, low conductivity material includes carbon and the high conductivity material includes a high conductivity metal.

20. The display sheet of claim 19 wherein the high conductivity metal is nickel or chromium or alloys thereof.

21. The method of claim 18 wherein the display sheet is in the form of a web that is sequentially moved through a plurality of evaporative deposition stations which deposit the two or more layers of the second conductor.

* * * * *